United States Patent
Perret et al.

(10) Patent No.: US 11,646,037 B2
(45) Date of Patent: May 9, 2023

(54) SAMPLE-EFFICIENT REPRESENTATION LEARNING FOR REAL-TIME LATENT SPEAKER STATE CHARACTERIZATION

(71) Applicant: OTO Systems Inc., New York, NY (US)

(72) Inventors: Valentin Alain Jean Perret, Zurich (CH); Nicolas Lucien Perony, Zurich (CH); Nándor Kedves, Adliswil (CH)

(73) Assignee: OTO Systems Inc., New York, NY (US)

( * ) Notice: Subject to any disclaimer, the term of this patent is extended or adjusted under 35 U.S.C. 154(b) by 0 days.

(21) Appl. No.: 17/115,382

(22) Filed: Dec. 8, 2020

(65) Prior Publication Data

US 2022/0044688 A1     Feb. 10, 2022

Related U.S. Application Data (60) Provisional application No. 63/061,018, filed on Aug. 4, 2020.

(51) Int. Cl.

| | |
|---|---|
| *G10L 17/18* | (2013.01) |
| *G10L 17/02* | (2013.01) |
| *G06N 3/04* | (2006.01) |
| *G06N 3/08* | (2006.01) |
| *G06N 3/049* | (2023.01) |
| *G06N 3/045* | (2023.01) |

(Continued)

(52) U.S. Cl.
CPC .............. *G10L 17/18* (2013.01); *G06N 3/045* (2023.01); *G06N 3/048* (2023.01); *G06N 3/049* (2013.01); *G06N 3/08* (2013.01); *G10L 17/02* (2013.01); *G10L 17/08* (2013.01)

(58) Field of Classification Search
CPC ......... G10L 17/18; G10L 17/02; G10L 17/08; G06N 3/0454; G06N 3/0481; G06N 3/049; G06N 3/08
USPC ....................................................... 704/246
See application file for complete search history.

(56) References Cited

U.S. PATENT DOCUMENTS

| | | | |
|---|---|---|---|
| 10,706,857 B1 * | 7/2020 | Ramasubramanian | ...................... G10L 17/18 |
| 2018/0358003 A1 * | 12/2018 | Calle | ...................... G10L 15/063 |

(Continued)

FOREIGN PATENT DOCUMENTS

WO     WO-2019084419 A1 *    5/2019         G06N 3/04

OTHER PUBLICATIONS

Alzantot, Moustafa, Ziqi Wang, and Mani B. Srivastava. "Deep residual neural networks for audio spoofing detection." arXiv preprint arXiv:1907.00501 (2019).*

(Continued)

*Primary Examiner* — Edwin S Leland, III
(74) *Attorney, Agent, or Firm* — Schwegman Lundberg & Woessner, P.A.

(57) ABSTRACT

Systems, methods, and non-transitory computer-readable media can provide audio waveform data that corresponds to a voice sample to a temporal convolutional network for evaluation. The temporal convolutional network can pre-process the audio waveform data and can output an identity embedding associated with the audio waveform data. The identity embedding associated with the voice sample can be obtained from the temporal convolutional network. Information describing a speaker associated with the voice sample can be determined based at least in part on the identity embedding.

20 Claims, 9 Drawing Sheets

(51) Int. Cl.
*G06N 3/048* (2023.01)
*G10L 17/08* (2013.01)

(56) References Cited

U.S. PATENT DOCUMENTS

| | | | |
|---|---|---|---|
| 2020/0211544 A1 | 7/2020 | Mikhailov | |
| 2020/0219517 A1 | 7/2020 | Wang et al. | |
| 2020/0349921 A1* | 11/2020 | Jansen | G10L 25/51 |
| 2021/0020161 A1 | 1/2021 | Gao | |
| 2021/0272571 A1* | 9/2021 | Balasubramaniam | G06N 20/00 |
| 2022/0044687 A1* | 2/2022 | Perret | G10L 17/04 |
| 2022/0044688 A1* | 2/2022 | Perret | G06N 3/049 |
| 2022/0115020 A1* | 4/2022 | Bradley | G06F 3/0334 |
| 2022/0188577 A1* | 6/2022 | Chopde | G06K 9/6264 |

OTHER PUBLICATIONS

Turpault, Nicolas, Romain Serizel, and Emmanuel Vincent. "Semi-supervised triplet loss based learning of ambient audio embeddings." ICASSP 2019—2019 IEEE International Conference on Acoustics, Speech and Signal Processing (ICASSP). IEEE, 2019.*

Zhang, Chunlei, Kazuhito Koishida, and John HL Hansen. "Text-independent speaker verification based on triplet convolutional neural network embeddings." IEEE/ACM Transactions on Audio, Speech, and Language Processing 26.9 (2018): 1633-1644.*

Hadsell, Raia, et al., "Dimensionality Reduction by Learning an Invariant Mapping," IEEE Computer Society Conference on Computer Vision and Pattern Recognition (CVPR'06), 2006, vol. 2, pp. 1735-1742.

Qian, Qi, et al., "SoftTriple Loss: Deep Metric Learning Without Triplet Sampling," Proceedings of the IEEE International Conference on Computer Vision, 2019, pp. 6450-6458.

Sohn, Kihyuk, "Improved Deep Metric Learning with Multi-class N-pair Loss Objective," 30th Conference on Neural Information Processing Systems (NIPS 2016), 2016, pp. 1857-1865.

Song, Hyun Oh, et al., "Deep Metric Learning via Lifted Structured Feature Embedding," Proceedings of the IEEE International Conference on Computer Vision and Pattern Recognition (CVPR), 2016, pp. 4004-4012.

Wang, Jian, et al., "Deep Metric Learning with Angular Loss," Proceedings of the IEEE International Conference on Computer Vision, 2017, pp. 4321-4329.

U.S. Appl. No. 17/169,843, Examiner Interview Summary dated Nov. 8, 2022, 2 pgs.

U.S. Appl. No. 17/169,843, Non Final Office Action dated Jul. 8, 2022, 11 pgs.

U.S. Appl. No. 17/169,843, filed Feb. 8, 2021, Speaker Separation based on Real-Time Latent Speaker State Characterization.

U.S. Appl. No. 17/169,843, Final Office Action dated Feb. 28, 2023, 11 pgs.

U.S. Appl. No. 17/169,843, Response filed Jan. 9, 2023 to Non Final Office Action dated Jul. 8, 2022, 11 pgs.

* cited by examiner

SAMPLE-EFFICIENT REPRESENTATION LEARNING FOR REAL-TIME LATENT SPEAKER STATE CHARACTERIZATION

CROSS-REFERENCE TO RELATED APPLICATIONS

This application claims priority to U.S. Provisional Patent Application No. 63/061,018, filed on Aug. 4, 2020 and entitled "SAMPLE-EFFICIENT REPRESENTATION LEARNING FOR REAL-TIME LATENT SPEAKER STATE CHARACTERISATION," which is incorporated herein by reference in its entirety.

FIELD OF THE INVENTION

The present technology relates to the field of automated speech recognition (ASR). More particularly, the present technology relates to augmented ASR techniques to capture latent speaker states.

BACKGROUND

Human language is an evolved ability that allows formulation and communication of complex thoughts. Spoken language in particular enables real-time, interactive, high-bandwidth communication of ideas across multiple actors in a conversation. This ability to seamlessly interact, debate, and collaborate was and continues to be one of the main driving forces behind the rise and ongoing development of human civilization.

As increasingly sophisticated and networked computer systems are built, the need to interact with such systems using natural language has become increasingly important. Conventional approaches to automatic speech recognition (ASR) have reached human parity in conversational speech recognition. However, such conventional approaches to ASR focus on the ability of a system to transform a stream of sound into a series of tokens representing the spoken words. These conventional approaches fail to consider or comprehend the way in which the words are uttered (e.g., intonation), non-verbal acoustic cues denoting latent states, and prosodic cues that embed information contained in speech. As an example, conventional ASR systems are unable to accurately and consistently distinguish the meaning of a heartfelt "thank you" versus a sarcastic "thank you".

SUMMARY

Various embodiments of the present technology can include systems, methods, and non-transitory computer readable media configured to provide audio waveform data that corresponds to a voice sample to a temporal convolutional network for evaluation. The temporal convolutional network can pre-process the audio waveform data and can output an identity embedding associated with the audio waveform data. The identity embedding associated with the voice sample can be obtained from the temporal convolutional network. Information describing a speaker associated with the voice sample can be determined based at least in part on the identity embedding.

In an embodiment, determining the information describing the speaker further includes determining an identity of the speaker associated with the voice sample based at least in part on the identity embedding.

In an embodiment, determining the information describing the speaker further includes determining that the speaker associated with the voice sample matches a known speaker based at least in part on the identity embedding.

In an embodiment, the temporal convolutional network is trained based on a triplet loss function that evaluates a plurality of triplets, wherein a triplet includes an anchor voice sample, a positive voice sample that has a threshold level of similarity to the anchor voice sample, and a negative voice sample that does not have a threshold level of similarity to the anchor voice sample.

In an embodiment, a triplet of voice samples is selected based on semi-hard triplet mining.

In an embodiment, the temporal convolutional network is trained based on at least one of: contrastive loss, lifted structures loss, N-pair loss, angular loss, or SoftTriple loss.

In an embodiment, the temporal convolutional network embeds the voice sample in a continuous high-dimensional identity space.

In an embodiment, the temporal convolutional network includes a plurality of temporal convolutional neural residual blocks (TCN blocks) that pre-process the audio waveform data.

In an embodiment, a TCN block applies a set of temporal causal convolutions to the audio waveform data.

In an embodiment, a TCN block includes a pair of consecutive one-dimensional convolutional layers using causal padding, and wherein the pair of consecutive one-dimensional convolutional layers are bypassed by an additive skip connection.

The figures depict various embodiments of the present technology for purposes of illustration only. The figures use like reference numerals to identify like elements. One skilled in the art will readily recognize from the following discussion that alternative and additional embodiments of the present technology apart from those illustrated in the figures can be employed without departing from the principles of the present technology described herein.

DETAILED DESCRIPTION

Conventional approaches for capturing latent speaker states from spoken conversations typically suffer from a number of limitations. For example, conventional approaches can be based on text modelling techniques, which can use transcribed text as a basis for inferring speaker states, such as emotions. Such conventional approaches are less accurate due to the inherently lossy nature of automated speech recognition (ASR), which does not capture speech intonation. These conventional approaches are also language-dependent and thus require extensive training for every new language or dialect. In another example, conventional approaches can use spectral representations or derived representations (e.g., MFCCs) of an audio signal, which can require exploring and tuning a number of parameters, such as the width and overlap of signal windows, or the number of filter banks. These conventional approaches can incur a high computational cost and result in loss of information due to the use of an intermediate representation. In yet another example, conventional approaches can be undesirably trained on either small amounts of high-quality data (e.g., annotated and reviewed by humans) or larger amounts of low-quality data (e.g., data collected from the Internet with noisy labels).

An improved approach rooted in computer technology overcomes the foregoing and other disadvantages associated with conventional approaches specifically arising in the realm of computer technology. The present technology provides a fused deep neural network architecture that can accept a stream of sound as input (e.g., a raw audio waveform) and can output its latent representation in the form of an identity embedding (or vector). The present technology can thus learn a representation directly from a raw waveform with no spectral transformation or language transcription needed. The fused deep neural network architecture includes a number of components, such as a pre-processing stage, a similarity learning process, and a speaker state classification stage. In various embodiments, all components of the fused deep neural network architecture can be defined through the same code, which allows the fused deep neural network architecture to be packaged into a single, unified model file. In contrast, conventional architectures typically comprise several individual components that each require separate training and tuning, thereby increasing deployment and maintenance costs. The present technology thus provides an end-to-end model that can process a voice sample as input and can output an identity vector in response. Identity vectors can be modeled for various applications. For example, in some embodiments, identity vectors can be used to generate identity-based pretrained markers. The identity-based pretrained markers can be used to detect various identity-based attributes (e.g., gender, age, etc.) from speech. In some embodiments, identity vectors can be used to generate language-based pretrained markers. The language-based pretrained markers can be used to detect various language-based attributes (e.g., spoken language, accent, etc.) from speech. More details relating to the present technology are provided below.

Figure 1A:
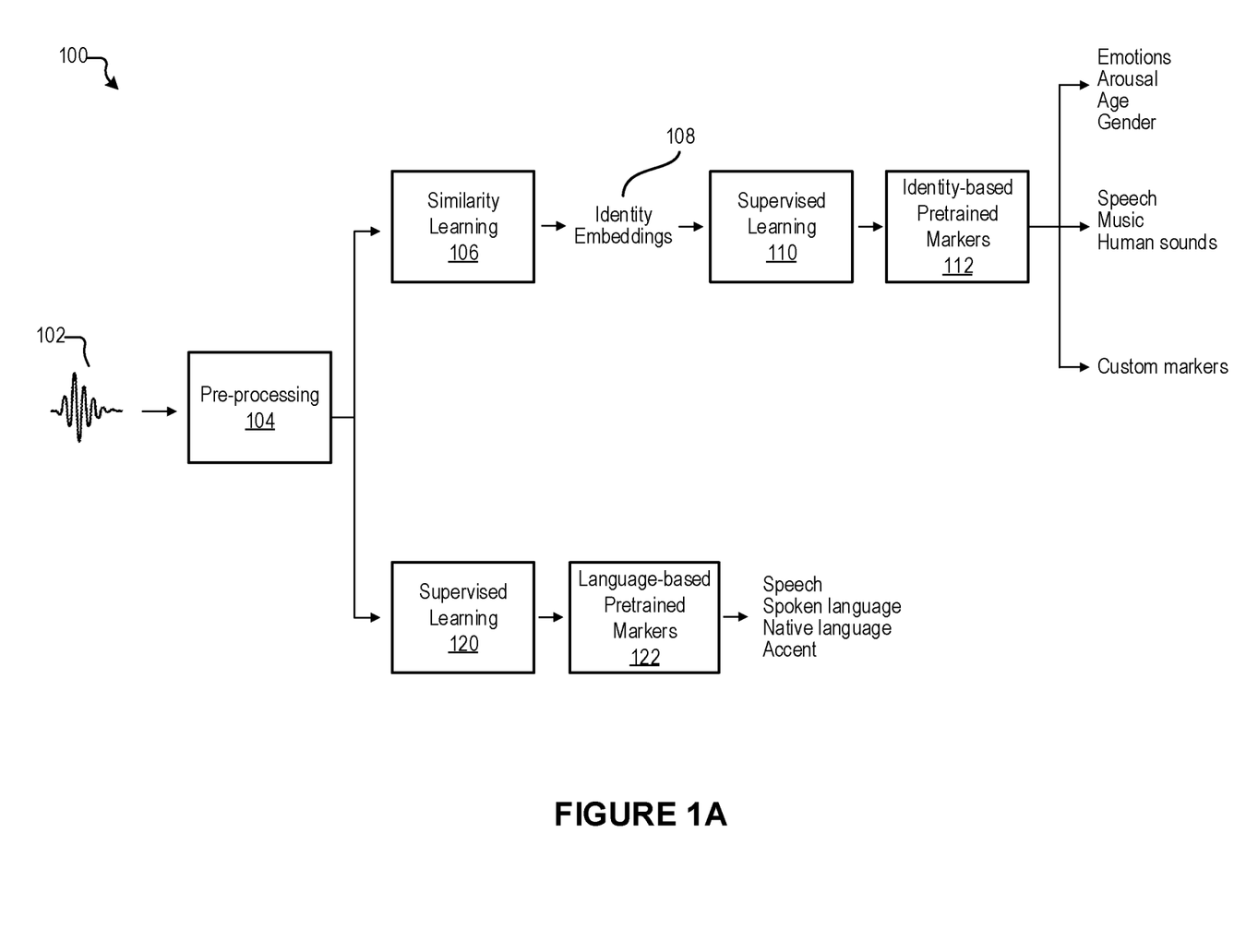
FIG. 1A illustrates an example fused deep neural network architecture, according to embodiments of the present technology.

FIG. 1A illustrates an example fused deep neural network architecture 100, according to an embodiment of the present technology. The example fused deep neural network architecture 100 can accept a stream of sound (e.g., a raw audio waveform) as input 102. For example, the architecture 100 can accept an uncompressed (PCM) audio signal sampled at 16 kHz as input. At block 104, the input 102 can be pre-processed by a convolutional neural network. For example, in some embodiments, the input 102 can be pre-processed by a temporal convolutional network, as described below. At block 106, similarity learning techniques can be applied to map an identity space or an embedding space (e.g., Euclidean space) based on a learned distance function. Based on similarity learning, the temporal convolutional network can be trained to generate identity embeddings 108 that provide latent representations of inputted audio waveforms. In general, identity embeddings of voice samples associated with the same speaker appear closer together in the identity space than identity embeddings of voice samples associated with other speakers. At block 110, identity embeddings can be analyzed based on supervised learning techniques. At block 112, identity-based pretrained markers can be generated based on the identity embeddings analyzed at block 110. As shown, identity-based pretrained markers can be applied to detect speaker emotion, arousal, age, and gender based on voice samples. As shown, identity-based pretrained markers also can be applied to detect speech, music, and human sounds. As shown, identity-based pretrained markers also can be applied to detect custom markers. At block 120, pre-processed output from block 104 can be analyzed based on supervised learning techniques. At block 122, language-based pretrained markers can be generated based on the identity embeddings analyzed at block 120. As shown, language-based pretrained markers can be applied to detect speech, spoken language, native language, and accent based on voice samples. Many variations are possible. More details describing various aspects of the fused deep neural network architecture 100 are provided herein.

Figure 1B:
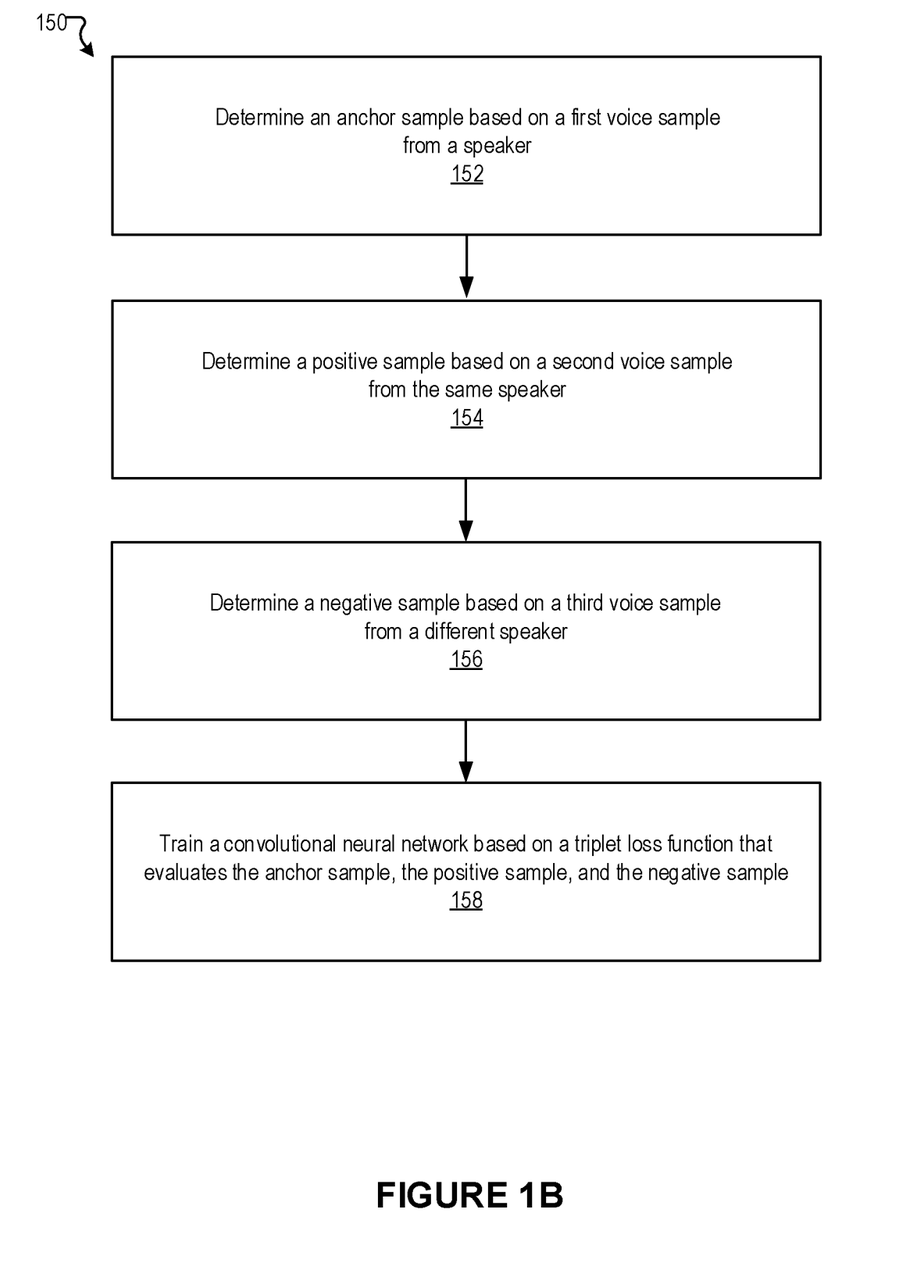
FIGS. 1B-1C illustrate example methods, according to embodiments of the present technology.

FIG. 1B illustrates an example method 150, according to an embodiment of the present technology. In some embodiments, the method 150 can be performed by a system 200 of FIG. 2. At block 152, an anchor sample can be determined based on a first voice sample from a speaker. At block 154, a positive sample can be determined based on a second voice sample from the same speaker. At block 156, a negative sample can be determined based on a third voice sample from a different speaker. In some embodiments, the samples can be selected through a semi-hard triplet mining process. Under this process, a triplet of samples can be selected so a negative sample is not closer to an anchor sample than a positive sample but still has positive loss, for example, due to a margin parameter. At block 158, a convolutional neural network (e.g., a temporal convolutional network) can be trained based on a triplet loss function that evaluates the anchor sample, the positive sample, and the negative sample. The result is an identity space, similar to a high-dimensional map in which voice samples from the same speaker are very close together while voice samples from distinct speakers are far apart. Because the model is trained on triplets of samples rather than individual samples, the amount of data available to a system during training increases combinatorially with the number of samples and distinct speakers in the training set. While not all triplets are suitable for training, this makes it possible to train an identity model on a relatively small amount of data, making the learned representation very sample-efficient. Many variations to the example methods are possible. It should be appreciated that there can be additional, fewer, or alternative steps performed in similar or alternative orders, or in parallel, within the scope of the various embodiments discussed herein unless otherwise stated.

Figure 1C:
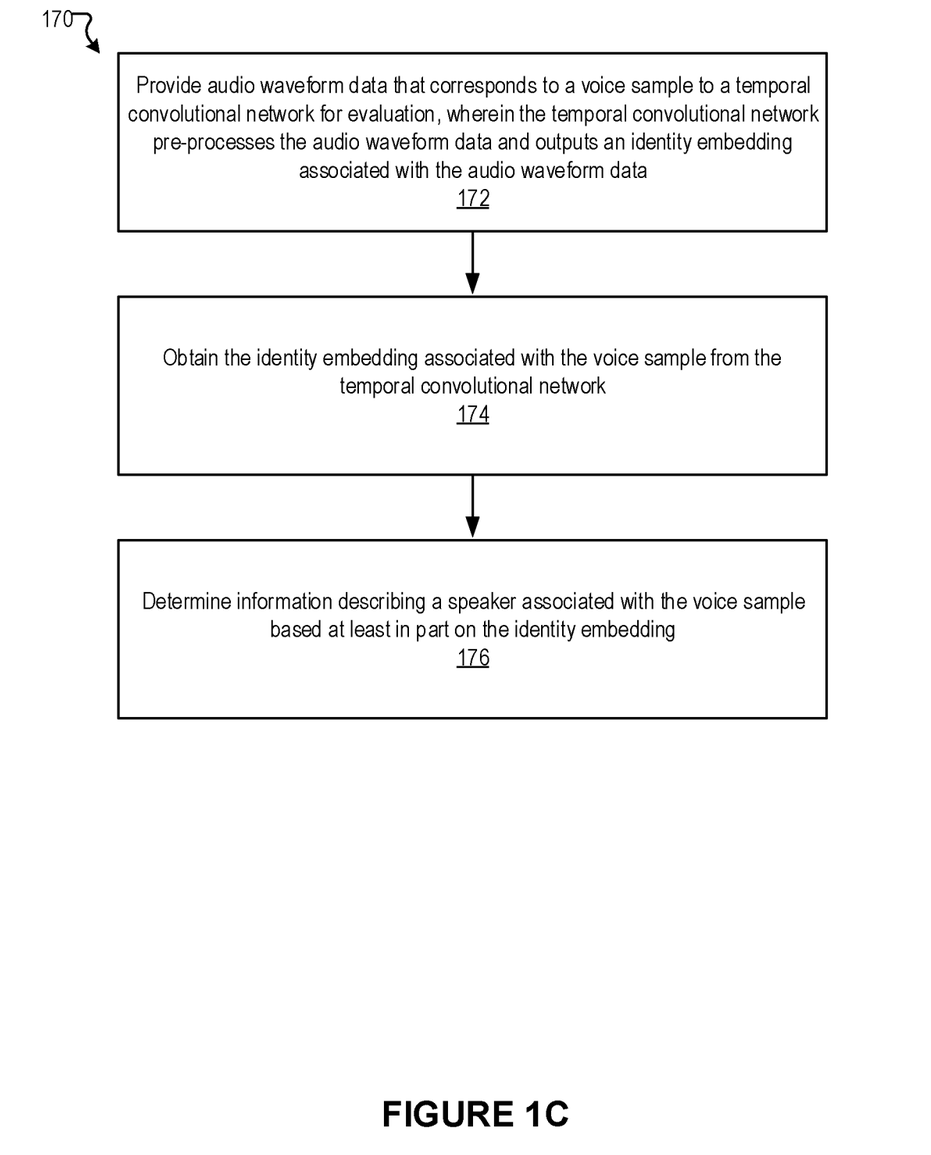

FIG. 1C illustrates an example method 170, according to an embodiment of the present technology. In some embodiments, the method 170 can be performed by the system 200 of FIG. 2. At block 172, audio waveform data that corresponds to a voice sample can be provided to a temporal convolutional network for evaluation. The temporal convolutional network can pre-process the audio waveform data and output an identity embedding associated with the audio waveform data. At block 174, the identity embedding associated with the voice sample can be obtained from the temporal convolutional network. At block 176, information describing a speaker associated with the voice sample can be determined based at least in part on the identity embedding. Many variations to the example methods are possible. It should be appreciated that there can be additional, fewer, or alternative steps performed in similar or alternative orders, or in parallel, within the scope of the various embodiments discussed herein unless otherwise stated.

Figure 2:
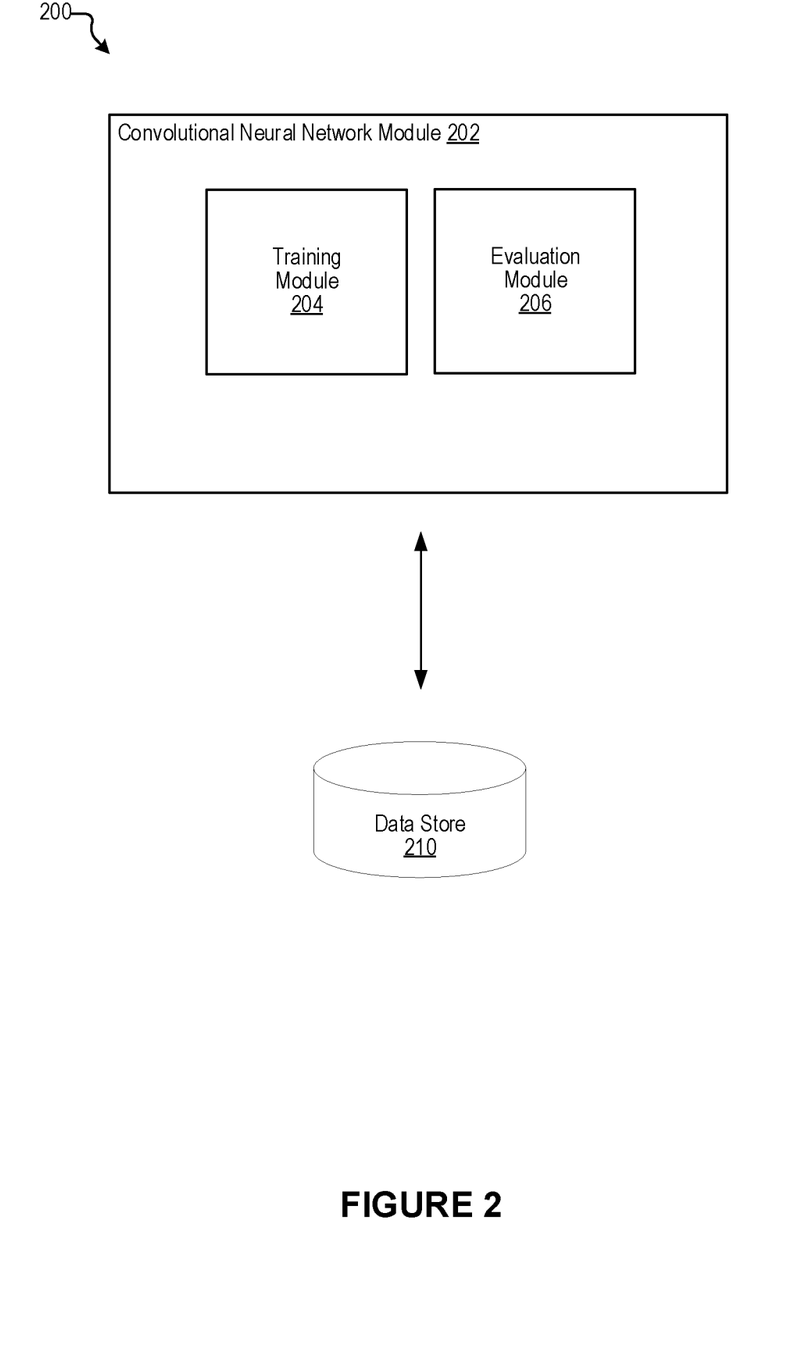
FIG. 2 illustrates an example system, according to an embodiment of the present technology.

FIG. 2 illustrates the example system 200, according to an embodiment of the present technology. The example system 200 can include a convolutional neural network module 202. The convolutional neural network module 202 can include a training module 204 and an evaluation module 206. The training module 204 and the evaluation module 206 can be implemented in one or more software applications running on one or more computing devices. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the training module 204 and the evaluation module 206 can be implemented in any suitable sequences and combinations. The convolutional neural network module 202 can communicate with a data store 210. The data store 210 can store various information needed to train and implement the convolutional neural network module 202. For example, the data store 210 can store training data, such as triplets of voice samples, that can be used to train a convolutional neural network.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a server or on a user or client computing device. For example, one or more modules and/or applications, or at least a portion thereof, can be implemented using one or more computing devices or systems that include one or more servers, such as network servers or cloud servers. As another example, one or more modules and/or applications described herein, or at least a portion thereof, can be implemented as or within an application (e.g., app), a program, or an applet, etc., running on a user computing device or a client computing system. It should be understood that there can be many variations or other possibilities.

The training module 204 can be configured to train a convolutional neural network. For example, the training module 204 can train a temporal convolutional network to process a stream of sound as input and in response output its latent representation, for example, in the form of a fixed-size embedding (or vector). In various embodiments, the temporal convolutional network can be trained based on similarity learning. For example, the training module 204 can apply metric learning to map a continuous high-dimensional identity space (e.g., Euclidean space) with a learned distance function. For example, the training module 204 can use similarity learning to embed audio waveform representations in the identity space. The identity space can be used to chart patterns that the temporal convolutional network has not yet seen (or processed). As a result, the temporal convolutional network can accurately map new inputs or variations of known inputs in the identity space. For example, a new input can be mapped to a precise and meaningfully structured region in the identity space that is distinct from regions that include known inputs. In another example, a variation of a known input can be mapped to a region that includes or is near the known input in the identity space. The learned identity space thus facilitates zero-shot learning.

The training module 204 can apply various loss functions to train the temporal convolutional network. For example, in some embodiments, the training module 204 can train the temporal convolutional network based on a triplet loss technique. The triplet loss technique can learn a loss function where a baseline (or anchor) sample is compared to a positive sample and a negative sample. For example, a triplet of samples can be formed by combining an anchor sample which corresponds to a voice sample from a given speaker, a positive sample which corresponds to another voice sample from the same speaker, and a negative sample which corresponds to a voice sample from a different speaker. The voice samples representing the anchor and positive sample can satisfy a threshold level of similarity. Further, the voice samples representing the anchor and positive sample can be of the same speaker in different states. For example, the voice sample representing the anchor sample may be captured while the speaker is at rest while the voice sample representing the positive sample may be captured while the speaker is in an angry mood. The voice samples representing the anchor and negative sample can be selected so they do not satisfy a threshold level of similarity. In various embodiments, the loss function applied by the training module 204 can penalize the temporal convolutional network when a learned distance between an anchor sample and a positive sample is smaller than a learned distance between the anchor sample and a negative sample plus a margin parameter. The margin parameter value can vary depending on the implementation and normalization. Many variations are possible.

The training module 204 can intelligently select triplets for training the temporal convolutional network using a semi-hard triplet mining process. For example, a set of triplets can be selected so a negative sample is not more similar to an anchor sample than a positive sample is to the anchor sample. Similarity can be based on distance in the identity space. In this example, the anchor sample, positive sample, and negative sample can still be associated with a positive loss due to the margin parameter, which can help speed up convergence. Based on training, the temporal convolutional network can learn an identity space which serves as a high-dimensional map in which voice samples from the same speaker are mapped very close together while voice samples from distinct speakers are mapped farther apart. By training the temporal convolutional network using triplets of samples rather than individual samples, the amount of data available during training can increase combinatorially with the number of samples and distinct speakers in a training set. In some embodiments, the training module 204 can use spatial dropouts in the temporal convolutional network for regularization during training.

The training module 204 can apply other loss functions to train the temporal convolutional network. For example, the training module 204 can apply other metric learning loss functions designed to optimize latent representation learning. For example, in some embodiments, the training module 204 can implement a contrastive loss function to train the temporal convolutional network. An example approach for implementing the contrastive loss function is described in Raia Hadsell, Sum it Chopra, and Yann LeCun "Dimensionality Reduction by Learning an Invariant Mapping," *IEEE Computer Society Conference on Computer Vision and Pattern Recognition (CVPR)*, 2006, Vol. 2, pp. 1735-1742. In some embodiments, the training module 204 can implement a lifted structures loss function to train the temporal convolutional network. The lifted structures loss can jointly optimize the distance function over all samples in a batch instead of a single pair or triplet. An example approach for implementing the lifted structures loss function is described in Hyun Oh Song, Yu Xiang, Stefanie Jegelka, and Silvio Savarese "Deep Metric Learning Via Lifted Structured Feature Embedding," *Proceedings of the IEEE International Conference on Computer Vision*, 2016, pp. 4004-4012. In some embodiments, the training module 204 can implement an N-pair loss function to train the temporal convolutional network. An example approach for implementing the N-pair loss function is described in Kihyuk Sohn "Improved Deep Metric Learning with Multi-class N-pair Loss Objective," *Advances in Neural Information Processing Systems*, 2016, pp. 1857-1865. In some embodiments, the training module 204 can implement an angular loss function to train the temporal convolutional network. An example approach for implementing the angular loss function is described in Jian Wang, Feng Zhou, Shilei Wen, Xiao Liu, and Yuanqing Lin "Deep Metric Learning with Angular Loss," *Proceedings of the IEEE International Conference on Computer Vision*, 2017, pp. 2593-2601. In some embodiments, the training module 204 can implement a SoftTriple loss function to train the temporal convolutional network. An example approach for implementing the SoftTriple loss function is described in Qi Qian, Lei Shang, Baigui Sun, Juhua Hu, Hao Li, and Rong Jin "SoftTriple Loss: Deep Metric Learning Without Triplet Sampling," *Proceedings of the IEEE International Conference on Computer Vision*, 2019, pp. 6450-6458. Again, many variations are possible.

Figure 3A:
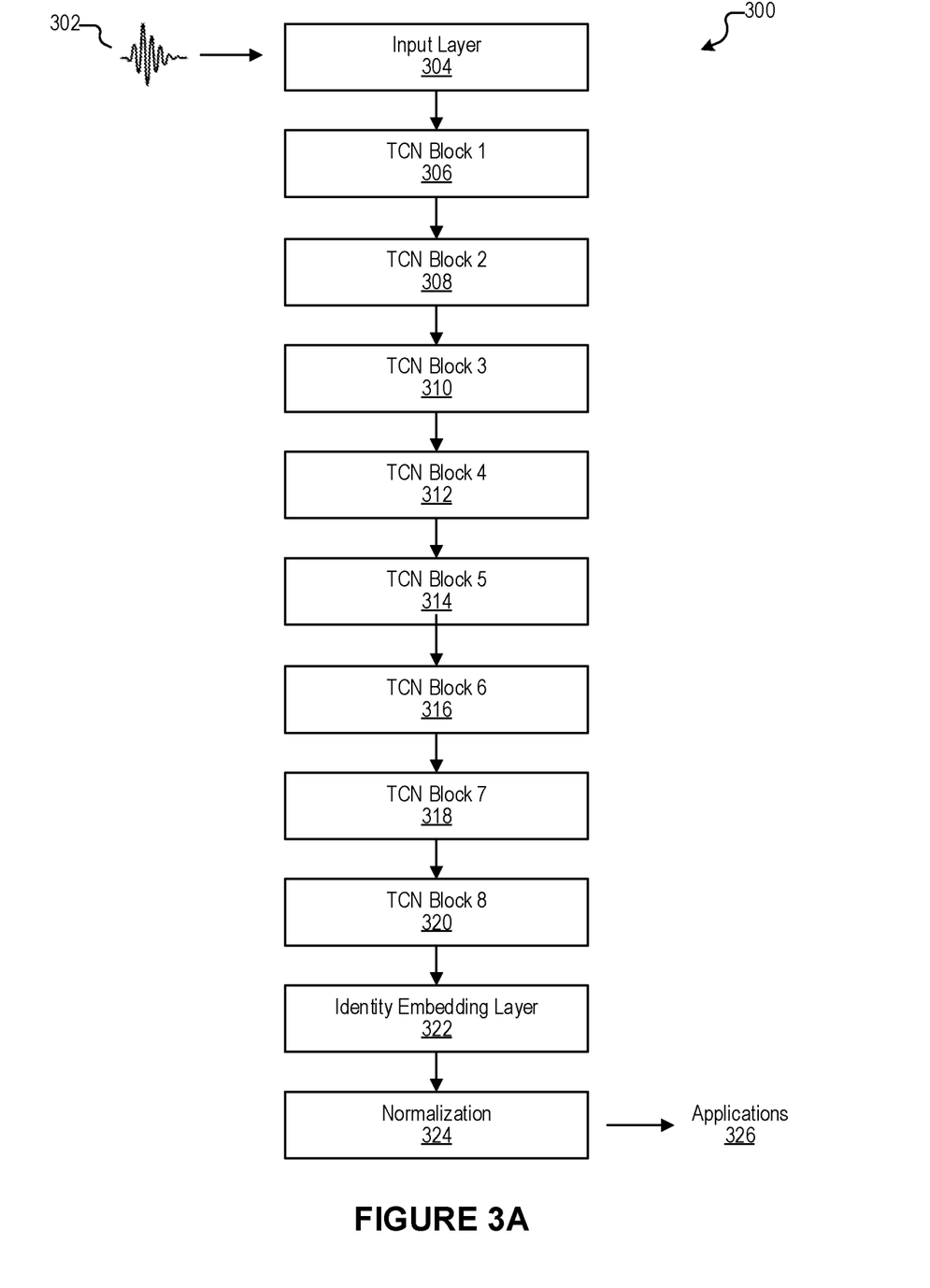
FIG. 3A illustrates an example neural network architecture, according to embodiments of the present technology.

The evaluation module 206 can be configured to process raw audio signals. For example, the evaluation module 206 can process a raw audio signal (e.g., audio waveform) as input and can output a corresponding latent representation of the raw audio signal in the form of an identity embedding (or vector). In various embodiments, the evaluation module 206 can be configured to implement a convolutional neural network as trained by the training module 204 to pre-process raw audio signals (e.g., raw waveforms). As background, conventional approaches for pre-processing audio typically rely on a front-end that accepts a raw audio signal as input. The front-end can extract features from the raw audio signal (e.g., Mel Frequency Cepstral Coefficients (MFCCs), Linear Prediction Coefficients (LPCs), Linear Prediction Cepstral Coefficients (LPCCs), Line Spectral Frequencies (LSFs), Discrete Wavelet Transform (DWT), and Perceptual Linear Prediction (PLP)). The extracted features can be provided to a classifier for further processing. These conventional approaches to pre-processing generally suffer from a number of disadvantages, such a high computational cost, a relatively large number of tunable parameters, and invariance to the data that goes through the front-end. That is, the front-end feature extractor is designed to extract a pre-defined and static set of features, and therefore is unable to learn to extract pertinent features. In contrast, the convolutional neural network implemented by the evaluation module 206 allows for pre-processing audio waveforms and determining corresponding identity embeddings in parallel while keeping a low memory footprint both at training and at inference unlike conventional approaches, such as conventional recurrent architectures. In some embodiments, the evaluation module 206 can implement a temporal convolutional network, as illustrated in the example of FIG. 3A. For example, a raw audio signal can be provided to the temporal convolutional network as input. The temporal convolutional network can extract descriptive features from the raw audio signal. The extracted features can be used to learn identity embeddings. Further, the identity embeddings can be analyzed to classify speakers and states (e.g., emotions). More details describing the temporal convolutional network are provided below in reference to FIG. 3A.

FIG. 3A illustrates an example temporal convolutional network 300 that can be trained and implemented by the convolutional neural network module 202, according to an embodiment of the present technology. The temporal convolutional network 300 includes an input layer, a series of temporal convolutional neural (TCN) residual blocks ("TCN blocks"), an identity embedding layer, and a normalization layer. In FIG. 3A, the temporal convolutional network 300 is shown with eight TCN blocks as just one example. Naturally, the number of TCN blocks can vary depending on the implementation. For example, the temporal convolutional network 300 can be implemented with four TCN blocks, six TCN blocks, or ten TCN blocks. Many variations are possible. In some embodiments, the TCN blocks are associated with a fixed kernel size (e.g., 4, 5, 6, etc.). In some embodiments, TCN blocks can be associated with varying kernel sizes. For example, TCN blocks that appear earlier in the temporal convolutional network 300 can be associated with a larger kernel size while TCN blocks that appear later in the temporal convolutional network 300 can be assigned progressively smaller kernel sizes. As an example, earlier TCN blocks can be associated with a kernel size of 4 while later TCN blocks can be associated with a kernel size of 2. Many variations are possible. In some embodiments, TCN blocks can be associated with a fixed number of filters. In some embodiments, the number of filters associated with a TCN block can vary. For example, the number of filters associated with a TCN block can increase at each layer of the temporal convolutional network 300. As an example, the number of filters can increase at each layer following powers of two.

At block 304, an input layer receives (or processes) an audio signal 302. For example, the audio signal 302 may correspond to a voice sample (or recording) associated with a human speaker. The input layer can receive audio signals based on a sampling rate (e.g., 16 kHz, 44.1 kHz, etc.), such as uncompressed pulse-code modulation (PCM) audio signals.

At block 306, the audio signal 302 can be passed through (or processed by) a set of trained temporal convolutional filters associated with a first TCN block included in the temporal convolutional network 300. The first TCN block can generate at least one first output. At block 308, the at least one first output can be passed through a set of trained temporal convolutional filters associated with a second TCN block included in the temporal convolutional network 300. The second TCN block can generate at least one second output. At block 310, the at least one second output can be passed through a set of trained temporal convolutional filters associated with a third TCN block included in the temporal convolutional network 300. The third TCN block can generate at least one third output. At block 312, the at least one third output can be passed through a set of trained temporal convolutional filters associated with a fourth TCN block included in the temporal convolutional network 300. The fourth TCN block can generate at least one fourth output. At block 314, the at least one fourth output can be passed through a set of trained temporal convolutional filters associated with a fifth TCN block included in the temporal convolutional network 300. The fifth TCN block can generate at least one fifth output. At block 316, the at least one fifth output can be passed through a set of trained temporal convolutional filters associated with a sixth TCN block included in the temporal convolutional network 300. The sixth TCN block can generate at least one sixth output. At block 318, the at least one sixth output can be passed through a set of trained temporal convolutional filters associated with a seventh TCN block included in the temporal convolutional network 300. The seventh TCN block can generate at least one seventh output. At block 320, the at least one seventh output can be passed through a set of trained temporal convolutional filters associated with an eighth TCN block included in the temporal convolutional network 300. The eighth TCN block can generate at least one eighth output.

At block 322, the at least one eighth output can be passed through an identity embedding layer included in the temporal convolutional network 300. The identity embedding layer can generate an identity embedding (or vector) that represents the audio signal 302. For example, the identity embedding can be a fixed-size vector that can be generated at some high frequency, such as every 64 milliseconds. At block 324, the identity embedding can be passed through a normalization layer included in the temporal convolutional network 300. At block 326, the identity embedding can be used for various applications. For example, in some embodiments, the identity embedding can be evaluated to identify a speaker. In some embodiments, the identity embedding can be evaluated to distinguish between speakers. For example, the identity embedding can be clustered along with other identity embeddings. In this example, all identity embeddings included in the same cluster can be associated with the same speaker. Many variations are possible. Depending on the implementation, the temporal convolutional network 300 and its TCN-based pre-processing architecture can vary in a number of ways including variations to the number of TCN blocks used, the number of filters associated with a TCN block, the pooling size of a max pooling operation associated with a TCN block, and kernel sizes associated with TCN blocks. For example, in an embodiment, a model with a shorter receptive field and low memory footprint can be built by reducing the kernel size of convolutions (e.g., kernel size 3) and setting a maximum number of filters (e.g., 64 filters). Many variations are possible.

Figure 3B:
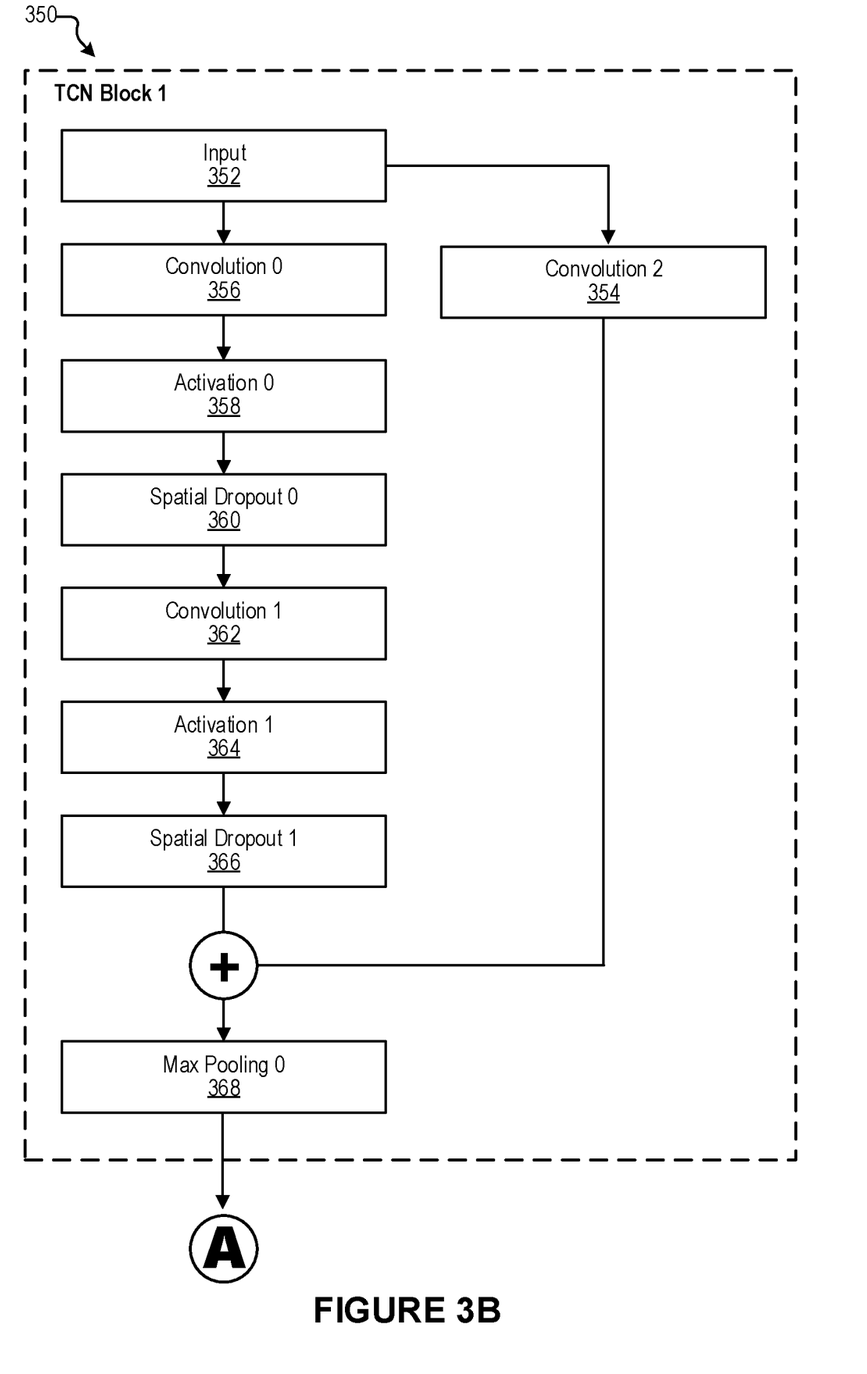
FIG. 3B illustrates an example TCN block, according to embodiments of the present technology.

FIG. 3B illustrates an example first TCN block 350 of a temporal convolutional network, according to an embodiment of the present technology. For example, the first TCN block 350 can be the first TCN block associated with block 306 of FIG. 3A. The TCN block 350 can be implemented by the convolutional neural network module 202 of FIG. 2.

At block 352, an input layer receives (or processes) an audio signal. For example, the audio signal 302 may correspond to a voice sample (or recording) associated with a human speaker. The input layer can receive audio signals based on some sampling rate (e.g., 16 kHz, 44.1 kHz, etc.), such as uncompressed pulse-code modulation (PCM) audio signals.

At block 354, the audio signal can be passed though (or processed by) a set of trained convolutional filters associated with a first convolutional layer ("Convolution 2"). For example, the set of trained convolutional filters can perform one-dimensional (1D) convolutions. The first convolutional layer can generate at least one first output. The at least one first output can be passed through an additive skip connection and provided to a max pooling layer at block 368.

At block 356, the audio signal can be passed through a set of trained convolutional filters associated with a second convolutional layer ("Convolution 0"). For example, the set of trained convolutional filters can perform one-dimensional (1D) convolutions. The second convolutional layer can generate at least one second output. In various embodiments, the first convolutional layer and the second convolutional layer are implemented as consecutive one-dimensional convolutional layers using causal padding. In such embodiments, the second convolutional layer can be bypassed by the additive skip connection. At block 358, a first activation function ("Activation 0") can be performed in relation to the at least one second output generated by the second convolutional layer. The first activation function can generate at least one third output. For example, the first activation function can be a sigmoid or softmax function. At block 360, the at least one third output can be passed through a first spatial dropout ("Spatial Dropout 0"). The first spatial dropout can generate at least one fourth output. At block 362, the at least one fourth output can be passed through a set of trained convolutional filters associated with a third convolutional layer ("Convolution 1"). For example, the set of trained convolutional filters can perform one-dimensional (1D) convolutions. The third convolutional layer can generate at least one fifth output. At block 364, a second activation function ("Activation 1") can be performed in relation to the at least one fifth output generated by the third convolutional layer. The second activation function can generate at least one sixth output. For example, the second activation function can be a sigmoid or softmax function. At block 366, the at least one sixth output can be passed through a second spatial dropout ("Spatial Dropout 1"). The second spatial dropout can generate at least one seventh output. The at least one first output from the first convolution layer at block 354 and the at least one seventh output from the second spatial dropout at block 366 can be passed through the additive skip connection and to a max pooling layer.

At block 368, the max pooling layer can generate an output that is passed to a subsequent TCN block, as described below in reference to FIG. 3C. In various embodiments, each TCN block can include a max pooling operation. The max pooling operations can allow the temporal convolutional network to compute over temporally extended swathes of inputted audio data as each layer processes the inputted audio data to generate a signal that is fed into a subsequent layer. The signal can gradually be compressed over the time dimension as the signal is propagated through layers of the temporal convolutional network, which also allows for a gradual increase of the feature dimension. The max pooling operations can also allow for controlling memory consumption by reducing the temporal size of the inputted audio data while enabling customization of a receptive field size associated with the temporal convolutional network.

Figure 3C:
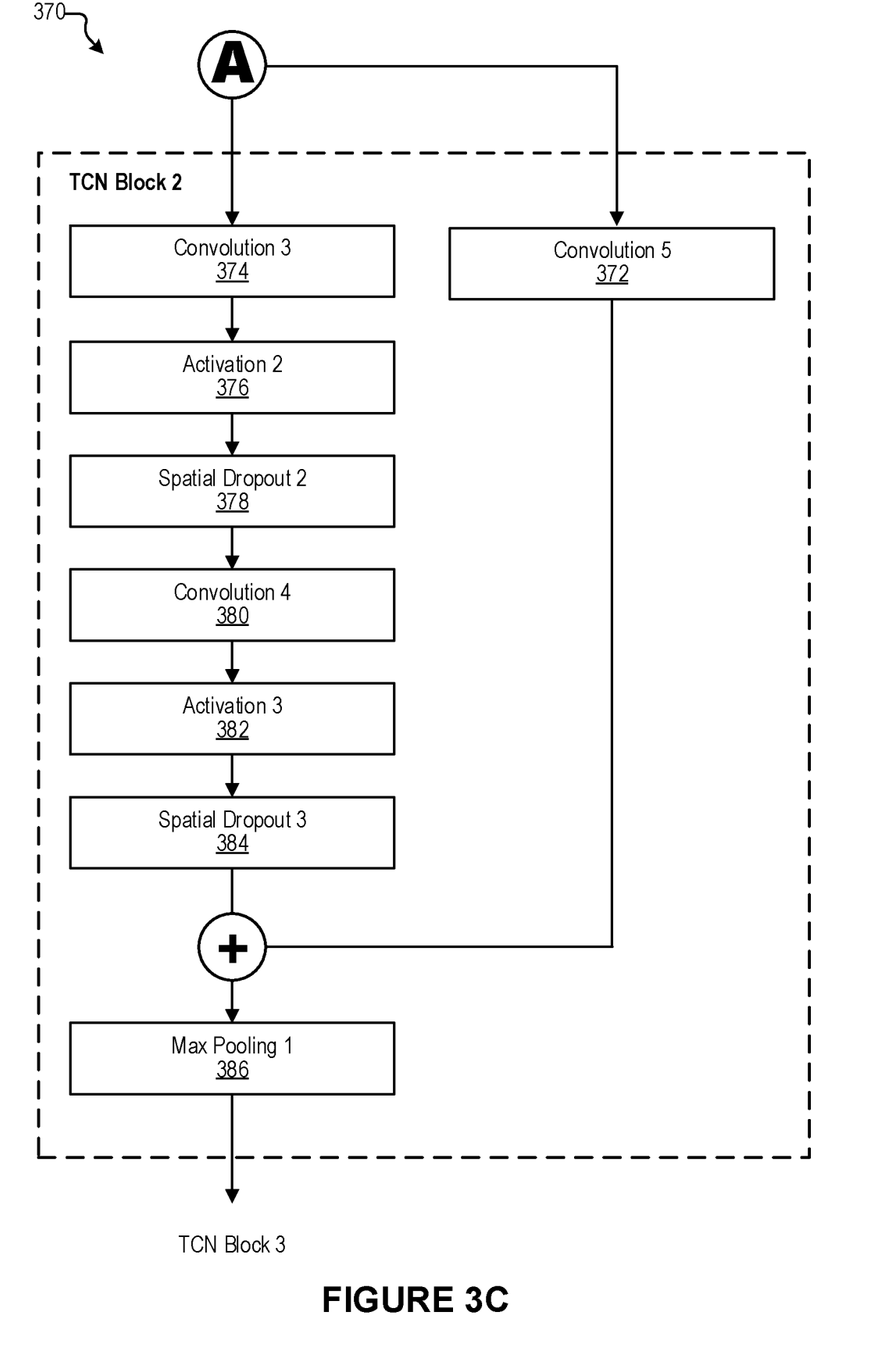
FIG. 3C illustrates another example TCN block, according to embodiments of the present technology.

FIG. 3C illustrates an example second TCN block 370 of a temporal convolutional network, according to an embodiment of the present technology. For example, the second TCN block 370 can be the second TCN block associated with block 308 of FIG. 3A. The TCN block 370 can be implemented by the convolutional neural network module 202 of FIG. 2.

At block 372, an output generated by a preceding TCN block can be passed though (or processed by) a set of trained convolutional filters associated with a first convolutional layer ("Convolution 5"). For example, the set of trained convolutional filters can perform one-dimensional (1D) convolutions. The first convolutional layer can generate at least one first output. The at least one first output can be passed through an additive skip connection and to a max pooling layer at block 386.

At block 374, the output generated by the preceding TCN block can be passed through a set of trained convolutional filters associated with a second convolutional layer ("Convolution 3"). For example, the set of trained convolutional filters can perform one-dimensional (1D) convolutions. The second convolutional layer can generate at least one second output. In various embodiments, the first convolutional layer and the second convolutional layer are implemented as consecutive one-dimensional convolutional layers using causal padding. In such embodiments, the second convolutional layer can be bypassed by the additive skip connection. At block 376, a first activation function ("Activation 2") can be performed in relation to the at least one second output generated by the second convolutional layer. The first activation function can generate at least one third output. For example, the first activation function can be a sigmoid or softmax function. At block 378, the at least one third output can be passed through a first spatial dropout ("Spatial Dropout 2"). The first spatial dropout can generate at least one fourth output. At block 380, the at least one fourth output can be passed through a set of trained convolutional filters associated with a third convolutional layer ("Convolution 4"). For example, the set of trained convolutional filters can perform one-dimensional (1D) convolutions. The third convolutional layer can generate at least one fifth output. At block 382, a second activation function ("Activation 3") can be performed in relation to the at least one fifth output generated by the third convolutional layer. The second activation function can generate at least one sixth output. For example, the second activation function can be a sigmoid or softmax function. At block 384, the at least one sixth output can be passed through a second spatial dropout ("Spatial Dropout 3"). The second spatial dropout can generate at least one seventh output. The at least one first output from the first convolution layer at block 372 and the at least one seventh output from the second spatial dropout at block 384 can be passed through the additive skip connection and to the max pooling layer. At block 386, the max pooling layer can generate an output that is passed to a subsequent TCN block, such as the third TCN block associated with block 310 of FIG. 3A.

Figure 4A:
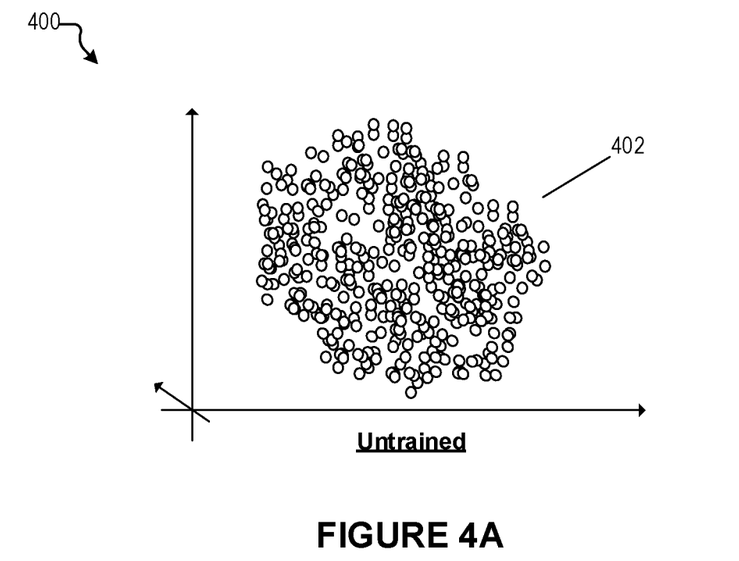
FIG. 4A illustrates an example mapping based on an untrained temporal convolutional network.
Figure 4B:
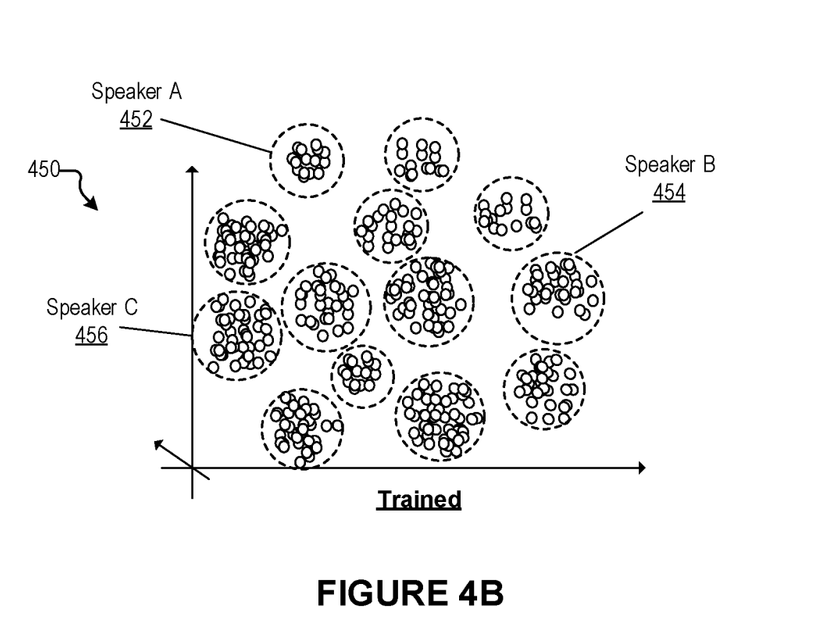
FIG. 4B illustrates an example mapping based on a trained temporal convolutional network, according to embodiments of the present technology.

FIG. 4A illustrates an example identity space 400. For example, FIG. 4A illustrates identity embedding mappings 402 of voice samples associated with different speakers in the identity space 400. In this example, the mappings 402 are determined by an untrained temporal convolutional network. As a result, the mappings 402 are indistinguishable from one another. In contrast, FIG. 4B illustrates another example identity space 450, according to an embodiment of the present technology. In FIG. 4B, identity embeddings of voice samples are mapped to the identity space 450 by a temporal convolutional network that has been trained as described herein. In this example, the trained temporal convolutional network has learned to map identity embeddings so that mappings of voice samples associated with the same speaker appear closer together in the identity space 450 than mappings of voice samples associated with different speakers. For example, FIG. 4B shows clusters of mappings including a cluster 452 associated with a Speaker A, a cluster 454 associated with a Speaker B, and a cluster 456 associated with a Speaker C. In various embodiments, the clusters can be labeled and used for classification. For example, in some embodiments, the clusters can be used to verify a speaker, for example, for biometric applications. For example, for any previously enrolled (or known) speaker, a determination can be made if an identity vector associated with a new voice sample corresponds to a cluster associated with the previously enrolled speaker. In some embodiments, clusters can be used to identify a speaker. For example, a speaker associated with a voice sample can be determined by mapping an identity embedding of the voice sample to a cluster of identity embeddings associated with the speaker. In some embodiments, clusters of voice samples can be used for speaker diarization. For example, given a conversation containing a set of voices, sometimes overlapping, segments of audio that belong to each speaker can be determined. If some of the speakers have previously been enrolled (e.g., identified, labeled, etc.), this can be combined with speaker verification to determine known identities in addition to timestamps. Many variations are possible.

Hardware Implementation

Figure 5:
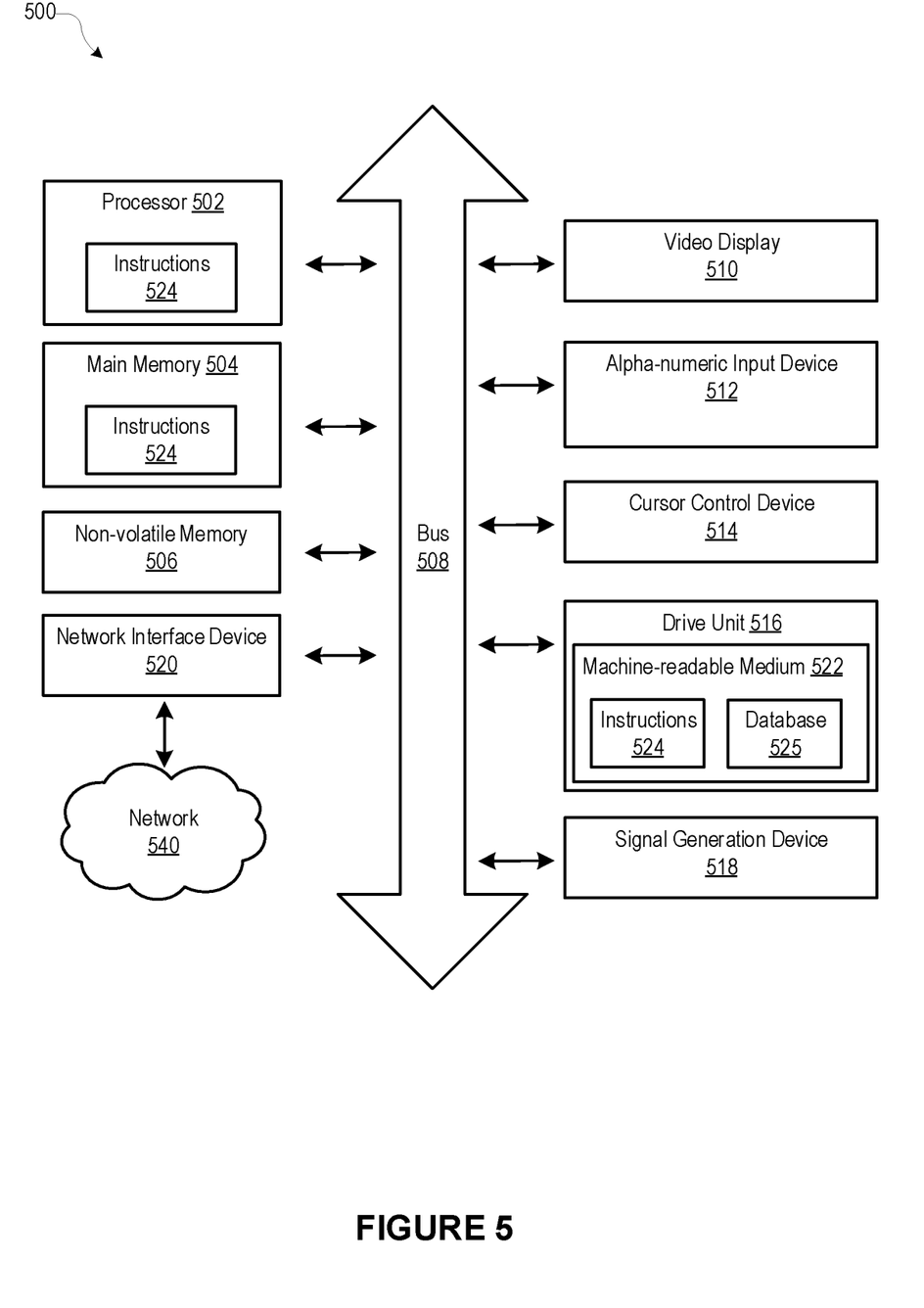
FIG. 5 illustrates an example of a computer system or computing device that can be utilized in various scenarios, according to embodiments of the present technology.

The foregoing processes and features can be implemented by a wide variety of machine and computer system architectures and in a wide variety of network and computing environments. FIG. 5 illustrates an example machine 500 within which a set of instructions for causing the machine to perform one or more of the embodiments described herein can be executed, in accordance with an embodiment of the present technology. The embodiments can relate to one or more systems, methods, or computer readable media. The machine may be connected (e.g., networked) to other machines. In a networked deployment, the machine may operate in the capacity of a server or a client machine in a client-server network environment, or as a peer machine in a peer-to-peer (or distributed) network environment.

The computer system 500 includes a processor 502 (e.g., a central processing unit (CPU), a graphics processing unit (GPU), or both), a main memory 504, and a nonvolatile memory 506 (e.g., volatile RAM and non-volatile RAM, respectively), which communicate with each other via a bus 508. The processor 502 can be implemented in any suitable form, such as a parallel processing system. In some cases, the example machine 500 can correspond to, include, or be included within a computing device or system. For example, in some embodiments, the machine 500 can be a server, desktop computer, a laptop computer, personal digital assistant (PDA), an appliance, a wearable device, a camera, a tablet, or a mobile phone, etc. In one embodiment, the computer system 500 also includes a video display 510, an alphanumeric input device 512 (e.g., a keyboard), a cursor control device 514 (e.g., a mouse), a drive unit 516, a signal generation device 518 (e.g., a speaker) and a network interface device 520.

In one embodiment, the video display 510 includes a touch sensitive screen for user input. In one embodiment, the touch sensitive screen is used instead of a keyboard and mouse. The disk drive unit 516 includes a machine-readable medium 522 on which is stored one or more sets of instructions 524 (e.g., software) embodying any one or more of the methodologies or functions described herein. The instructions 524 can also reside, completely or at least partially, within the main memory 504 and/or within the processor 502 during execution thereof by the computer system 500. The instructions 524 can further be transmitted or received over a network 540 via the network interface device 520. In some embodiments, the machine-readable medium 522 also includes a database 525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 506 may also be a random access memory. The non-volatile memory 506 can be a local device coupled directly to the rest of the components in the computer system 500. A non-volatile memory that is remote from the system, such as a network storage device coupled to any of the computer systems described herein through a network interface such as a modem or Ethernet interface, can also be used.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, model (e.g., machine learning model), network (e.g., neural network), module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 500 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, models, networks, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," "for example," "in another example," or the like means that a particular feature, design, structure, or characteristic described in connection with the embodiment is included in at least one embodiment of the disclosure. The appearances of, for example, the phrases "according to an embodiment", "in one embodiment", "in an embodiment", "in various embodiments," or "in another embodiment" or the like in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, audio waveform data that corresponds to a voice sample to a temporal convolutional network for evaluation, wherein the temporal convolutional network pre-processes the audio waveform data and outputs an identity embedding associated with the audio waveform data and wherein the temporal convolutional network includes a plurality of temporal convolutional neural (TCN) blocks that pre-process the audio waveform data and wherein a TCN block of the plurality of TCN blocks includes a pair of consecutive one-dimensional convolutional layers using causal padding;
   obtaining, by the computing system, the identity embedding associated with the voice sample from the temporal convolutional network; and
   determining, by the computing system, information describing a speaker associated with the voice sample based at least in part on the identity embedding.

2. The computer-implemented method of claim 1, wherein determining the information describing the speaker further comprises:
   determining, by the computing system, an identity of the speaker associated with the voice sample based at least in part on the identity embedding.

3. The computer-implemented method of claim 1, wherein determining the information describing the speaker further comprises:
   determining, by the computing system, that the speaker associated with the voice sample matches a known speaker based at least in part on the identity embedding.

4. The computer-implemented method of claim 1, wherein the temporal convolutional network is trained based on a triplet loss function that evaluates a plurality of triplets, wherein a triplet includes an anchor voice sample, a positive voice sample that has a threshold level of similarity to the anchor voice sample, and a negative voice sample that does not have a threshold level of similarity to the anchor voice sample.

5. The computer-implemented method of claim 4, wherein a triplet of voice samples is selected based on semi-hard triplet mining.

6. The computer-implemented method of claim 1, wherein the temporal convolutional network is trained based on at least one of: contrastive loss, lifted structures loss, N-pair loss, angular loss, or SoftTriple loss.

7. The computer-implemented method of claim 1, wherein the temporal convolutional network embeds the voice sample in a continuous high-dimensional identity space.

8. The computer-implemented method of claim 1, wherein a TCN block applies a set of temporal causal convolutions to the audio waveform data.

9. A system comprising:
   at least one processor; and
   a memory storing instructions that, when executed by the at least one processor, cause the system to perform a method comprising:
   providing audio waveform data that corresponds to a voice sample to a temporal convolutional network for evaluation, wherein the temporal convolutional network pre-processes the audio waveform data and outputs an identity embedding associated with the audio waveform data and wherein the temporal convolutional network includes a plurality of temporal convolutional neural (TCN) blocks that pre-process the audio waveform data and wherein a TCN block of the plurality of TCN blocks includes a pair of consecutive one-dimensional convolutional layers using causal padding;
   obtaining the identity embedding associated with the voice sample from the temporal convolutional network; and
   determining information describing a speaker associated with the voice sample based at least in part on the identity embedding.

10. The system of claim 9, wherein determining the information describing the speaker further causes the system to perform:
    determining an identity of the speaker associated with the voice sample based at least in part on the identity embedding.

11. The system of claim 9, wherein determining the information describing the speaker further causes the system to perform:

determining that the speaker associated with the voice sample matches a known speaker based at least in part on the identity embedding.

12. The system of claim 9, wherein the temporal convolutional network is trained based on a triplet loss function that evaluates a plurality of triplets, wherein a triplet includes an anchor voice sample, a positive voice sample that has a threshold level of similarity to the anchor voice sample, and a negative voice sample that does not have a threshold level of similarity to the anchor voice sample.

13. The system of claim 12, wherein a triplet of voice samples is selected based on semi-hard triplet mining.

14. A non-transitory computer-readable storage medium including instructions that, when executed by at least one processor of a computing system, cause the computing system to perform operations, the operations comprising:
providing audio waveform data that corresponds to a voice sample to a temporal convolutional network for evaluation, wherein the temporal convolutional network pre-processes the audio waveform data and outputs an identity embedding associated with the audio waveform data and wherein the temporal convolutional network includes a plurality of temporal convolutional neural (TCN) blocks that pre-process the audio waveform data and wherein a TCN block of the plurality of TCN blocks includes a pair of consecutive one-dimensional convolutional layers using causal padding;
obtaining the identity embedding associated with the voice sample from the temporal convolutional network; and
determining information describing a speaker associated with the voice sample based at least in part on the identity embedding.

15. The non-transitory computer-readable storage medium of claim 14, wherein determining the information describing the speaker further causes the computing system to perform: determining an identity of the speaker associated with the voice sample based at least in part on the identity embedding.

16. The non-transitory computer-readable storage medium of claim 14, wherein determining the information describing the speaker further causes the computing system to perform:
determining that the speaker associated with the voice sample matches a known speaker based at least in part on the identity embedding.

17. The non-transitory computer-readable storage medium of claim 14, wherein the temporal convolutional network is trained based on a triplet loss function that evaluates a plurality of triplets, wherein a triplet includes an anchor voice sample, a positive voice sample that has a threshold level of similarity to the anchor voice sample, and a negative voice sample that does not have a threshold level of similarity to the anchor voice sample.

18. A computer-implemented method comprising:
providing, by a computing system, audio waveform data that corresponds to a voice sample to a temporal convolutional network for evaluation, wherein the temporal convolutional network pre-processes the audio waveform data and outputs an identity embedding associated with the audio waveform data and wherein the temporal convolutional network includes a plurality of temporal convolutional neural (TCN) blocks that pre-process the audio waveform data and wherein a pair of consecutive one-dimensional convolutional layers of a TCN block of the plurality of TCN blocks is bypassed by an additive skip connection;
obtaining, by the computing system, the identity embedding associated with the voice sample from the temporal convolutional network; and
determining, by the computing system, information describing a speaker associated with the voice sample based at least in part on the identity embedding.

19. A system comprising:
at least one processor; and
a memory storing instructions that, when executed by the at least one processor, cause the system to perform a method comprising:
providing audio waveform data that corresponds to a voice sample to a temporal convolutional network for evaluation, wherein the temporal convolutional network pre-processes the audio waveform data and outputs an identity embedding associated with the audio waveform data and wherein the temporal convolutional network includes a plurality of temporal convolutional neural (TCN) blocks that pre-process the audio waveform data and wherein a pair of consecutive one-dimensional convolutional layers of a TCN block of the plurality of TCN blocks is bypassed by an additive skip connection;
obtaining the identity embedding associated with the voice sample from the temporal convolutional network; and
determining information describing a speaker associated with the voice sample based at least in part on the identity embedding.

20. A non-transitory computer-readable storage medium including instructions that, when executed by at least one processor of a computing system, cause the computing system to perform operations, the operations comprising:
providing audio waveform data that corresponds to a voice sample to a temporal convolutional network for evaluation, wherein the temporal convolutional network pre-processes the audio waveform data and outputs an identity embedding associated with the audio waveform data and wherein the temporal convolutional network includes a plurality of temporal convolutional neural (TCN) blocks that pre-process the audio waveform data and wherein a pair of consecutive one-dimensional convolutional layers of a TCN block of the plurality of TCN blocks is bypassed by an additive skip connection;
obtaining the identity embedding associated with the voice sample from the temporal convolutional network; and
determining information describing a speaker associated with the voice sample based at least in part on the identity embedding.

\* \* \* \* \*